Feb. 17, 1925.
H. C. MALLORY ET AL
1,527,154
PACKLESS VALVE
Filed March 23, 1920
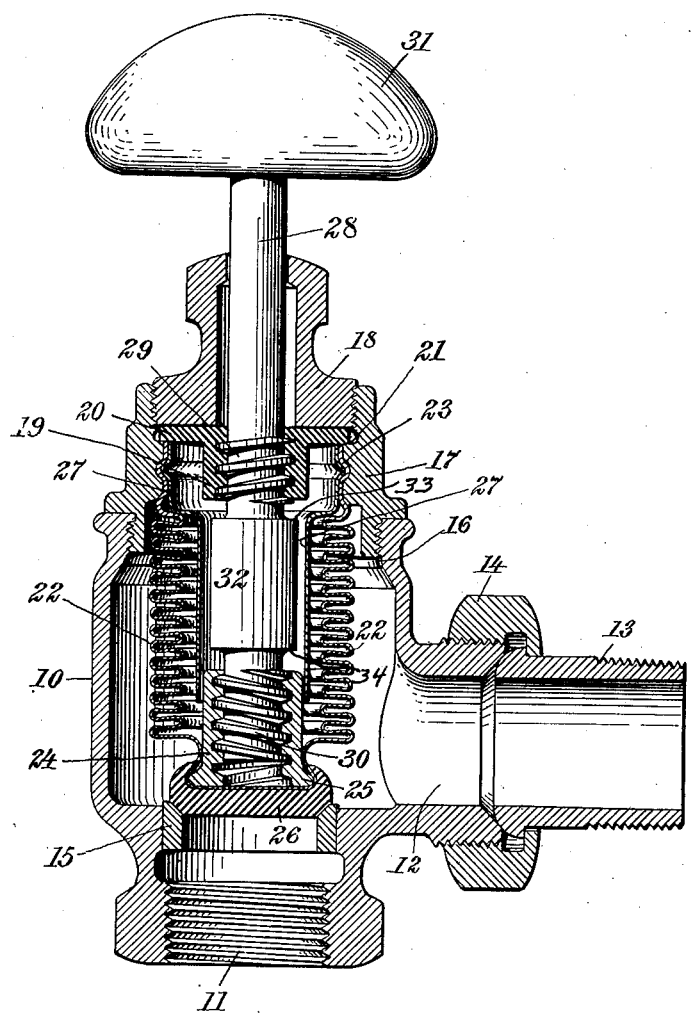
Inventors
Harry C. Mallory and H. F. Clark
By Conrad A. Dutcher
their ATTORNEY.

Patented Feb. 17, 1925.

1,527,154

UNITED STATES PATENT OFFICE.

HARRY C. MALLORY, OF BELLEPORT, AND HOWARD F. CLARK, OF NEW YORK, N. Y., ASSIGNORS, BY MESNE ASSIGNMENTS, TO AMERICAN RADIATOR COMPANY, OF NEW YORK, N. Y., A CORPORATION OF NEW JERSEY.

PACKLESS VALVE.

Application filed March 23, 1920. Serial No. 368,055.

*To all whom it may concern:*

Be it known that we, HARRY C. MALLORY, a citizen of the United States, residing at Belleport, Suffolk County, State of New York, and HOWARD F. CLARK, a citizen of the United States, residing at the city of New York, borough of Manhattan, in the county and State of New York, have invented certain new and useful Improvements in Packless Valves, of which the following is a full, clear, and exact specification.

Our invention relates to improvements in means for controlling the flow of fluids and the same has for its object, more particularly, to provide a simple, efficient and reliable valve which is simple in construction, positive in operation, and capable of easy separation or opening to permit of repairing or cleaning.

Further said invention has for its object to provide a valve of the packless type permitting of full opening and complete closing with a minimum rotation of the operating handwheel and stem.

Further said invention has for its object to provide a valve having an extensible and contractible member carrying a valve, and an operating stem in engagement with a plurality of threaded members which are caused to approach and recede to and from each other as the operating stem is rotated.

Other objects will in part be obvious and in part be pointed out hereinafter.

To the attainment of the aforesaid objects and ends, our invention consists in the novel details of construction, and in the combination, connection and arrangement of parts hereinafter more fully described and then pointed out in the claims.

The accompanying drawing forming part of the specification is a central section showing one form of valve constructed according to, and embodying our said invention.

In said drawing 10 designates a valve casing having an inlet connection 11 at its bottom, and an outlet connection 12 at its side, to which is connected a screw-threaded nipple 13 by a nut 14.

Between the inlet 11 and the outlet 12 the casing is provided with a removable valve seat 15.

The upper end of the casing 10 is provided with an interiorly threaded opening 16 adapted to receive the exteriorly threaded, lower end of a bonnet 17, to the upper end of which a cap 18 is detachably secured. Positioned within the bonnet 17 is a nut 19 which is securely held against rotation by means of a flange 20 clamped between the cap 18 and a shoulder 21 formed on the bonnet 17.

Within the casing 10 is an extensible and contractible member 22, which is shown as consisting of a cylindrical shell of flexible metal having corrugations formed in its wall, and having its upper end open and its lower end closed. The upper end of the member 22 is rigidly secured to the bonnet 17 by having a portion of its wall expanded into an annular groove 23 formed in the inner surface of the bonnet 17 to form a fluid-tight joint. The lower closed end of the member 22 is free to move, and positioned within the same is a nut 24 firmly held against rotation in any suitable manner, as, for example, by providing the nut 24 with a flange 25, at its lower end, and pressing or crimping the lower portion of the wall of the member 22 into engagement therewith. The threads of the nut 24 are inclined in a direction opposite to that of the threads of the nut 19, for a purpose hereinafter set forth, and both of the threads are preferably of a comparatively high pitch. Secured to the lower end of the member 22, in any suitable manner, is a valve 26 adapted to co-act with the valve seat 15 to control the flow of fluid therethrough.

Positioned within the extensible and contractible member 22 is a sleeve 27, the upper end of which is rigidly attached to the bonnet 17 by having a portion of the wall expanded into the groove 23, and the lower end of which surrounds the upper end of the nut 24 and serves to guide the movement thereof.

Movement of the valve 26, to move it into and out of engagement with the valve seat 15, is effected by means of a valve stem 28 having a screw thread 29, intermediate its ends, co-acting with the thread of the nut 19, and having an oppositely disposed screw thread 30 at its lower end co-acting with the thread of the nut 24. To the upper end of the valve stem 28, which extends without the valve casing, is secured a suitable hand-wheel 31 by means of which the valve stem 28 may be rotated. As the threads of the nuts 19 and 24, and the co-acting threads 29 and 30, respectively, of the valve stem 28, are oppositely disposed, it will be seen that, as the valve stem 28 is rotated, it will move in the direction of its length and effect a corresponding movement of the nut 24, and, simultaneously with such movement the nut 24 will also be caused to move longitudinally with respect to the valve stem 28, thereby insuring a double movement of the nut 24, which will cause a quick and relatively large travel of the valve 26 for a relatively small turning movement of the valve stem 28.

The valve stem 28 is provided intermediate the threads 29 and 30, with an enlarged portion 32, forming a stop, having at its upper end a shoulder 33 adapted to co-act with the nut 19 to limit the upward movement of the valve stem 28, and having at its lower end a shoulder 34 adapted to co-act with the nut 24 to limit the upward movement thereof relatively to the valve stem 28.

In operation, assuming the valve 26 to be in its closed position, as the valve stem 28 is rotated, it will move upwardly, due to the co-action of the screw-thread 29 with the fixed nut 19, and this movement of the valve stem 28 will lift the nut 24, thereby causing an upward movement of the lower free end of the member 22, and of the valve 26 carried thereby. At the same time, the rotation of the valve stem 28, through the medium of the screw thread 30, will cause the nut 24 to travel upwardly upon the valve stem 28, and this movement of the nut 24 will serve to increase the upward movement of the valve 26. It will thus be seen that the upward or opening movement of the valve 26 is due partly to the longitudinal movement of the nut 24 with respect to the valve stem 28, and that, therefore, the travel of the valve 26, for a given amount of rotation of the valve stem 28, is double that of what it would be if the valve stem were of the usual single thread type. Furthermore, by forming the co-acting threads of the nuts 19 and 24, and the valve stem 28, with a high pitch, the rate of movement of the valve 26 will be increased, and, as one of the threaded couples operates against the other, there will be sufficient friction between the co-acting threads to hold the valve firmly in either its open or closed position.

Having thus described our said invention what we claim and desire to secure by Letters Patent is:—

1. A valve comprising a casing having a valve seat therein, a bonnet in said casing, an extensible-contractible member having one end secured to said bonnet and its other end free, a valve carried by the free end of said extensible-contractible member, a valve stem, means adjacent to the ends of said extensible-contractible member, means on said valve stem cooperating with said means whereby when said valve stem is actuated said valve stem will be reciprocated with respect to said casing, and the free end of said extensible-contractible member and the parts carried thereby reciprocated with respect to said valve stem, and means for guiding the free end of said extensible-contractible member and said valve during the reciprocations thereof, substantially as specified.

2. A valve comprising a casing having a valve seat therein, a bonnet secured in said casing, an extensible-contractible tubular member having an open, and a closed end, and said open end secured to said bonnet, and having its closed end free, a valve carried by the free end of said extensible-contractible member, means rigid with the opposite ends of said extensible-contractible member, a valve stem extending into said extensible-contractible member and operatively engaging said means whereby when said valve stem is actuated the same will be reciprocated with respect to said casing, and the free end of said extensible-contractible member and the parts carried thereby reciprocated with respect to said valve stem, and means arranged within said extensible-contractible member for guiding the free end thereof during the reciprocations thereof, substantially as specified.

3. A valve comprising a casing having a valve seat therein, a bonnet secured in said casing, an extensible-contractible tubular member having an open, and a closed end, and said open end secured to said bonnet and its closed end free, a valve secured to the free end of said extensible-contractible member, a tubular guide secured to the open end of said extensible-contractible member and extending into the same, a threaded member secured adjacent to the open end of said extensible-contractible member, a threaded member secured within said extensible-contractible member at its closed end, and a valve stem extending through said first-named threaded member and into said second-named threaded member and operatively engaging said threaded members whereby when said valve stem is actuated the same will be reciprocated with respect to said casing, and the free end of said extensible-contractible member and the valve carried thereby reciprocated with respect to said valve stem, substantially as specified.

4. A valve comprising a casing having a valve seat therein, a bonnet secured to said casing, an extensible-contractible tubular member having an open, and a closed end, and said open end secured to said bonnet and its closed end free, a valve secured to the free end of said extensible-contractible member, a tubular guide secured to the open end of said extensible-contractible member and extending into the same, a threaded member secured adjacent to the open end of said extensible-contractible member, a threaded member secured within said extensible-contractible member at its closed end, and a valve stem extending through said first-named threaded member and into said second-named threaded member and operatively engaging said threaded members whereby when said valve stem is actuated the same will be reciprocated with respect to said casing, and the free end of said extensible-contractible member and the valve carried thereby reciprocated with respect to said valve stem, and a stop on said valve stem intermediate said threaded members for limiting the contracting movement of said extensible-contractible member, substantially as specified.

5. A valve comprising a casing having a valve seat therein, a bonnet secured in said casing, an extensible-contractible tubular member having an open, and a closed end, and said open end secured to said bonnet and its closed end free, a valve secured to the outer side of the free end of said extensible-contractible member, a tubular guide secured to the open end of said extensible-contractible member and extending into the same, a flanged threaded member disposed in said bonnet adjacent to the open end of said extensible-contractible member, means for securing said flanged threaded member in position, a threaded member secured within said extensible-contractible member at its closed end, and a valve stem extending through said first-named threaded member and into said second-named threaded member and operatively engaging the same whereby when said valve stem is actuated the same will be reciprocated with respect to said casing, and the free end of said extensible-contractible member and the valve carried thereby reciprocated with respect to said valve stem, substantially as specified.

6. A valve comprising a casing having a valve seat therein, a bonnet removably secured to said casing, an extensible-contractible tubular member having an open, and a closed end, and said open end secured to said bonnet and its closed end free, a valve secured to the outer side of the free end of said extensible-contractible member, an annular member secured to the open end of said extensible-contractible member, a tubular guide extending therefrom and into said extensible-contractible member, a flanged threaded member disposed in said bonnet adjacent to the open end of said extensible-contractible member, a cap for securing said flanged threaded member in position, a threaded member secured within said extensible-contractible member at its closed end, a valve stem, oppositely threaded portions thereon, and a stop on said valve stem intermediate said threaded portions for limiting the contracting movement of said extensible-contractible member; said threaded portions operatively engaging the threaded members at the opposite ends of said extensible-contractible member whereby when said valve stem is actuated it will be reciprocated with respect to said casing, and the free end of said extensible-contractible member and the valve carried thereby reciprocated with respect to said valve stem, substantially as specified.

7. A valve comprising a casing having a valve seat therein, a bonnet removably supported upon said casing, an extensible and contractible member having one end secured to said bonnet and having its other end free to move, a valve carried by the free end of said member and co-acting with said valve seat, a nut supported upon said bonnet, a cap removably secured to said bonnet and serving to hold said nut against movement, a nut fixed within the free end of said member, said nuts being provided with oppositely disposed threads, and a rotatable valve stem having oppositely disposed screw threads engaging the threads in said nuts, substantially as specified.

Signed in the city of New York, county of New York, State of New York, this 14th day of January one thousand nine hundred and twenty.

HARRY C. MALLORY.
HOWARD F. CLARK.

Witnesses:
 OTTO F. HORNEIER,
 WARREN H. BARTON.